UNITED STATES PATENT OFFICE.

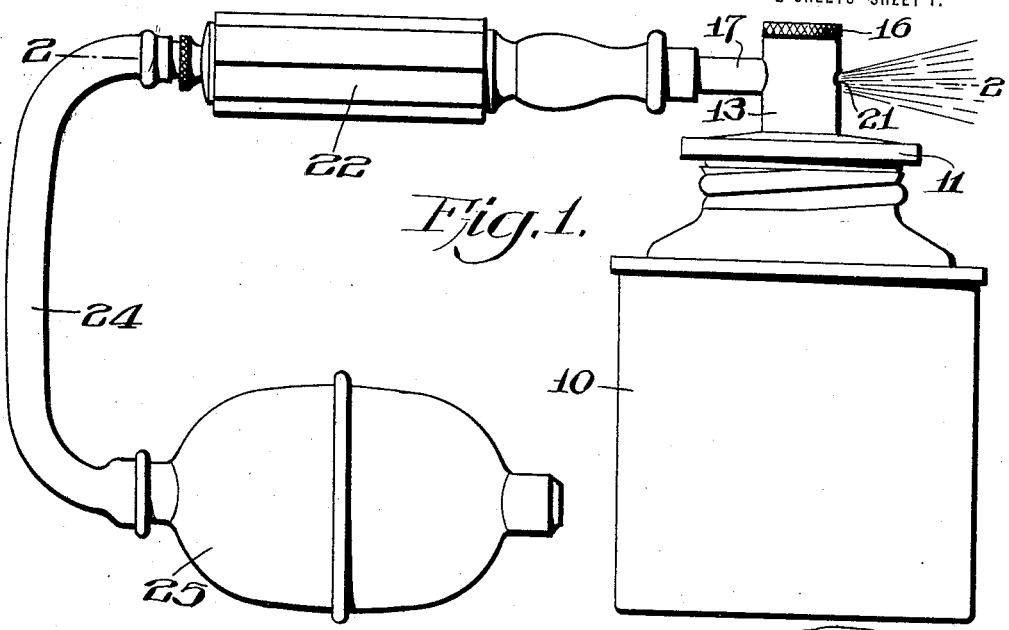

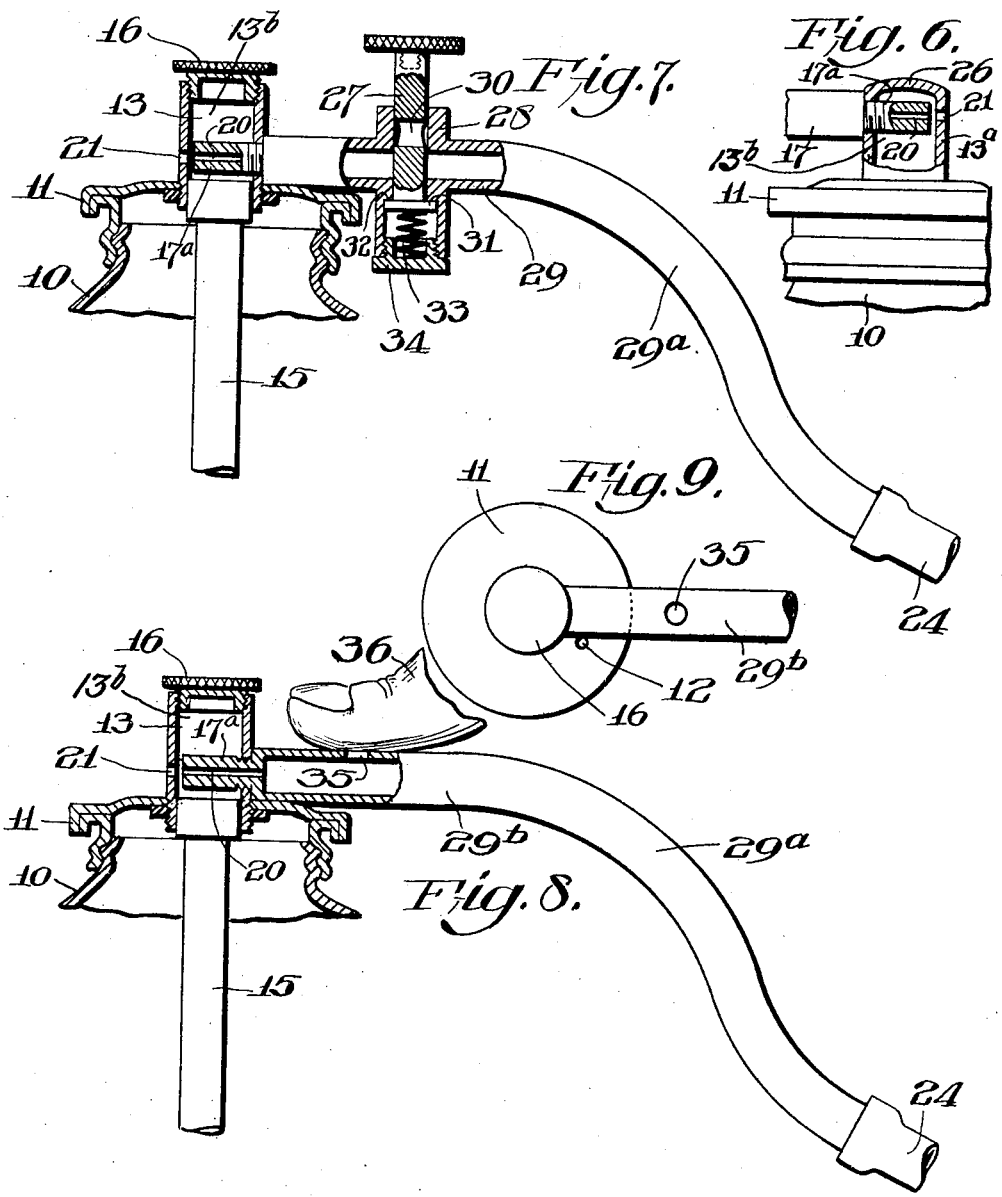

JAMES J. HOLLAND, OF PHILADELPHIA, PENNSYLVANIA, ASSIGNOR OF ONE-HALF TO FREDERICK F. FISCHER, OF PHILADELPHIA, PENNSYLVANIA.

SPRAYER.

1,331,643.     Specification of Letters Patent.     Patented Feb. 24, 1920.

Application filed June 19, 1918. Serial No. 240,722.

*To all whom it may concern:*

Be it known that I, JAMES J. HOLLAND, a citizen of the United States, residing at Philadelphia, in the county of Philadelphia and State of Pennsylvania, have invented certain new and useful Improvements in Sprayers, of which the following is a specification.

One object of my invention is to provide a sprayer or atomizer of a durable and simple construction which can be quickly and cheaply manufactured.

Another object is to so construct my improved sprayer that it can be used to efficiently spray molten or liquid wax, oils, paints, or other comparatively thick liquids.

Another object is to provide my improved sprayer with a handle which is so mounted on the air tube that it can be quickly removed from said tube to permit the latter to be heated and cleaned from time to time.

Another object is to provide my improved sprayer with means whereby the spray can be intermittently discontinued or entirely cut off.

These objects, and other advantageous ends which will be described hereinafter, I attain in the following manner, reference being had to the accompanying drawings in which—

Figure 1 is a front elevation of a sprayer made in accordance with my invention, Fig. 2 is a sectional plan view taken on the line 2—2 of Fig. 1, Fig. 3 is a fragmentary sectional elevation taken on the line 3—3 of Fig. 2, Fig. 4 is a fragmentary sectional plan view showing certain of the parts of Fig. 2 drawn on a slightly enlarged scale, Fig. 5 is a view of similar nature to Fig. 4, showing a variation in the relative sizes of certain of the parts, Fig. 6 is a fragmentary sectional elevation showing a slight modification in the head of the sprayer, Fig. 7 is a fragmentary sectional elevation showing a modified form of certain of the elements of my invention, Fig. 8 is a view of the same general type as Fig. 7, showing still another modification of certain of the elements of my invention, and Fig. 9 is a fragmentary top plan view of Fig. 8.

Referring to Figs. 1 to 4, inclusive, of the drawing, 10 represents a container for the liquid to be sprayed and is illustrated in the form of a can having a top 11 screwed thereon and provided with a vent hole 12. A hollow head 13, in the form of a short length of pipe which is inserted through the top 11, is screw threaded so as to be held to said top 11 by a nut 14 (see Fig. 3). This hollow head 13 provides a cylindrical chamber 13$^b$ the axis of which extends in the direction of the height of said container.

A pipe 15 communicates with the interior of the head 13 and depends into the liquid in the container 10. The top of the head 13 is provided with a cap 16 which is screw threaded therein, as clearly shown in Fig. 3.

A metallic tube 17 extends through a hole 18 in the side of the head 13 and is open at its inner end. This inner end of the tube 17 is cut straight across or at right angles to the axis of the tube 17 and parallel with the axis of the head 13. Thus even though the inner end of the tube 17 is jammed against the inner surface of the head 13, a space 19 will be provided between the inner end of the tube 17 and the adjacent portion of the inner surface of the head 13.

The tube 17 has a duct or passage 20 and this duct is in direct line with a spray hole 21 in the side of the head 13.

The tube 17 forms a support for a handle 22, said handle being adapted to be freely slid on and off of said tube 17. The outer end of the tube 17 is screw threaded and a nipple 23 is screwed on said threaded end of the tube 17 and thereby holds the handle 17 in position. This nipple 23 forms a coupling for an air hose 24 for supplying compressed air. This hose can be connected to any source of supply and, as shown in Fig. 1, the hose 24 is connected to an ordinary hand-operated rubber bulb 25 which, when squeezed, will serve to force air through the hose 24, tube 17, space 19, and spray hole 21. In so doing the compressed air being forced through the space 19 will form a suction in said space and cause a suction to be set up within the pipe 15. This causes liquid to rise in the pipe 15 into the head 13 and when this liquid comes into the space 19 it is ejected by the force of compressed air passing from the tube 15 through the space 19 out of the spray hole 21 in the form of an atomized spray.

By this construction it is a comparatively easy matter to provide the head 13 with the hole 18 and to insert the tube 17. This tube can be inserted into the head 13 to various extents; the greater the width of the space 19 the coarser will be the spray.

Further than this, the relation between the external diameter of the tube 17 and the internal diameter of the head may be varied to regulate the spray. In other words, as shown in Fig. 5, the tube $17^a$ is of larger diameter than the tube 17 shown in Fig. 4. However, the internal diameters of the head are the same. This causes the space $19^a$ to be wider than the space 19, as shown in Fig. 4. Thus in Fig. 5 the compressed air passing through the tube $17^a$ is compelled to pass through a larger space before it reaches the spray hole $21^a$, and the elements of Fig. 5 will produce a coarser spray than will the elements in the arrangement as shown in Fig. 4.

If it is desired to vary the spray the end of the tube 17 can be made screw threaded, as clearly shown in Fig. 3, or if ready adjustment is not desired the tube 17 can be soldered within the hole 18.

By providing the cap 16 access may be had to the interior of the head 13 for cleaning purposes. When the device is used for spraying warm wax, if any of the wax should tend to clog the tube 17 the handle 22 can be readily removed therefrom and the tube 17 can be heated over a burner so as to melt the wax and thereby clear the tube.

The handle 27 provides a convenient hand hold and the tube 17 forms a dual function, namely, as a conduit for the compressed air and also as a support for the handle.

In Fig. 6 I have shown substantially the same construction as shown in Figs. 1 to 4, inclusive, with the exception that instead of providing a removable cap as the cap 16, the head $13^a$, which corresponds to the head 13, is closed at its top as shown at 26. In all other respects the parts are similar to those described in connection with Figs. 1 to 4, inclusive, and I have given corresponding parts similar reference numerals.

In Fig. 7 I have illustrated a construction including a stem 27 which is slidable within a housing 28 in a compressed air supply pipe 29. This stem 27 is provided with a transversely extending port or passageway 30. The lower end of the stem 27 is provided with a flange 31 which is adapted to abut a shoulder 32 to limit the upward movement of said stem. The bottom of the stem 27 is pressed by a spring 33 which is supported upon the top of a cap 34 which is screwed into the bottom of the housing 28. The spring 33 normally holds the port 30 out of alinement with the interior of the supply tube 29. Thus the bottom portion of the stem 27 cuts off the passage of air through the tube 29. In this form I have illustrated the tube 29 curved at $29^a$ to form a hand hold. In all other respects the construction is similar to that above described in connection with Figs. 1 to 4, inclusive, and I have, therefore, given corresponding parts similar reference numerals.

It will be noted that in the form of my invention shown in Fig. 7 that when the stem 27 is pressed downwardly by the finger the port 30 will be brought into register with the passageway in the tube 29 and air will be admitted to produce the spray. However, when the stem is released the spring 33 will move the stem upwardly so that the port will be moved out of alinement with the passageway of the tube 29 and the air will be cut off to stop the spray.

In the form of my invention shown in Figs. 8 and 9, the air supply tube $29^b$ is provided with a hole 35 and as long as a person holds a finger as indicated at 36, over the hole 35, the air will pass through the tube to produce the spray. However, upon the release of the finger 36 to uncover the hole 35, the air within the tube $29^b$ will escape through the hole 35 and the spray will not be produced. In all other respects the form of my invention shown in Figs. 8 and 9 is similar to that described in connection with Fig. 7 and I have given corresponding parts similar reference numerals.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A sprayer including a liquid container; a head therefor having a cylindrical inner surface providing a cylindrical chamber, the axis of said chamber extending in the direction of the height of the container, said head having a spray hole leading inwardly to said inner surface in a direction transversely to the axis of said surface; and an air tube having an end portion of less external diameter than the internal diameter of said head and extending through the side of said head opposite the spray hole transversely into said chamber, said tube having a duct in alinement with said spray hole, the innermost end surface of said tube being flat and adapted to contact with said inner surface at the side of said spray hole whereby the curvature of said inner surface provides a suction space between the spray hole and the outlet end of said air tube duct, substantially as described.

2. A sprayer including a liquid container; a head for the container having a chamber providing an inner curved wall and a spray hole leading inwardly to said wall; and an air tube entering said chamber, said air tube having a duct in alinement with said spray hole, the innermost end surface of said tube being included in a plane at right angles to the axis of said tube and adapted to contact with said inner surface at the side of the spray hole whereby the curvature of said wall provides a suction space between the spray hole and the outlet end of said air tube duct; substantially as described.

3. A sprayer including a liquid container; a head therefor having a cylindrical inner surface providing a chamber, said head having a spray hole leading inwardly to said inner surface in the direction transversely to the curvature of said surface; and an air tube having an end portion extending through the side of said head opposite the spray hole transversely into said chamber, said tube having a duct in alinement with said spray hole, the innermost end surface of said tube being included in a plane at right angles to the axis of said tube so as to contact with said inner surface at the side of the spray hole whereby the curvature of said inner surface provides a suction space between the spray hole and the outlet end of the air tube duct; substantially as described.

4. A sprayer including a liquid container; a removable top for the container having a hole therethrough; a hollow cylindrical head having an open end extending through said hole and being externally screw threaded; a nut fitting the screw threaded portion of said head and being located inside of said top, said head having an inner chamber; a suction pipe extending through said open end of the head and fitting within said chamber, said head having a spray hole leading inwardly to said chamber in a direction transversely to the axis of said head; and an air tube having an end portion extending into said chamber, said tube having a duct in alinement with said spray hole, the innermost end of said duct being spaced from said spray hole, substantially as described.

5. A sprayer including a compressed air tube; a handle removably mounted on said tube; and means connected to said tube for supplying air thereto, said means including a nipple detachably connected to said tube, said nipple serving to prevent the removal of said handle from said tube, substantially as described.

In testimony whereof I have signed my name to this specification in the presence of two subscribing witnesses.

JAMES J. HOLLAND.

Witnesses:
 MARY A. INGLAR,
 CHAS. E. POTTS.